A. PELKE & F. E. HAYES.
APPARATUS FOR MAKING CONCRETE BLOCKS.
APPLICATION FILED SEPT. 11, 1912.

1,075,936.

Patented Oct. 14, 1913.

2 SHEETS—SHEET 1.

WITNESSES

INVENTORS
Arthur Pelke,
Floyd E. Hayes.
Attorney

A. PELKE & F. E. HAYES.
APPARATUS FOR MAKING CONCRETE BLOCKS.
APPLICATION FILED SEPT. 11, 1912.

1,075,936.

Patented Oct. 14, 1913.

2 SHEETS—SHEET 2.

WITNESSES

INVENTORS
Arthur Pelke,
Floyd E. Hayes.
By ......, Attorney.

UNITED STATES PATENT OFFICE.

ARTHUR PELKE AND FLOYD EDMOND HAYES, OF MEXICO, MEXICO.

APPARATUS FOR MAKING CONCRETE BLOCKS.

1,075,936.   Specification of Letters Patent.   Patented Oct. 14, 1913.

Application filed September 11, 1912. Serial No. 719,870.

*To all whom it may concern:*

Be it known that we, ARTHUR PELKE and FLOYD E. HAYES, citizens of the United States, residing at Mexico city, Mexico, have invented certain new and useful Improvements in Apparatus for Making Concrete Blocks, of which the following is a specification.

This invention relates to apparatus for making concrete building blocks, and one of the principal objects of the invention is to provide reliable and efficient means for quickly filling the mold boxes from above and discharging the finished blocks from below.

Another object of the invention is to provide an apparatus of the character referred to in which a series of mold boxes are moved upon a circular track under a stationary hopper for filling the mold boxes, moving the mold boxes progressively to a point where the blocks are pressed, and then moving said boxes to a point where the blocks are dropped through the open bottoms of the boxes and through an opening in the table on to a support or upon pallets for removal and curing.

Still another object of the invention is to provide an apparatus for carrying on a continuous process of filling mold boxes, pressing the blocks, and discharging the finished product.

These and other objects may be attained by means of the apparatus illustrated in the accompanying drawings, in which—

Figure 1:
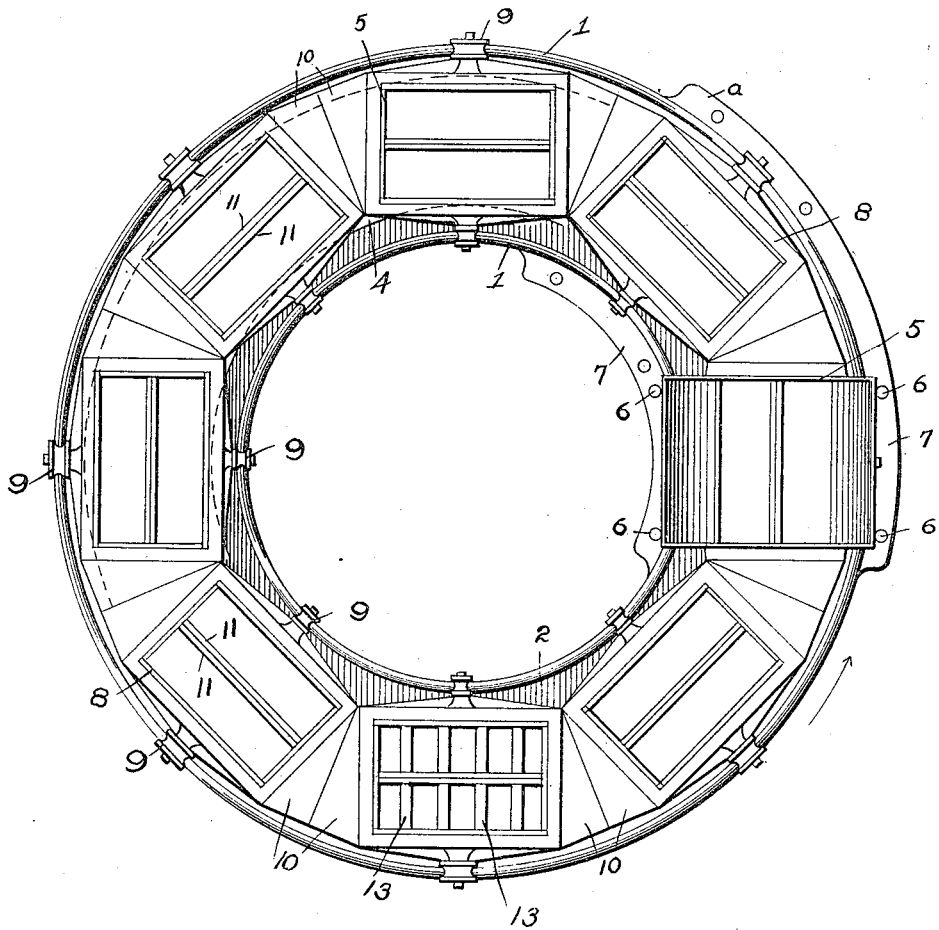
Figure 2:
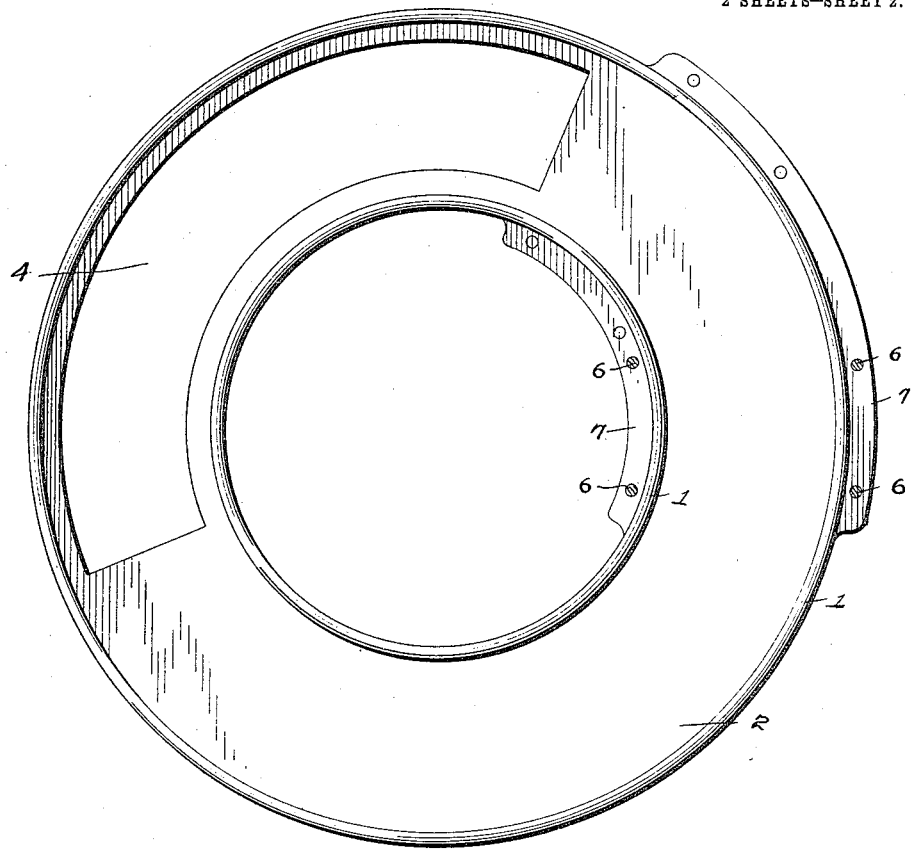
Figure 3:
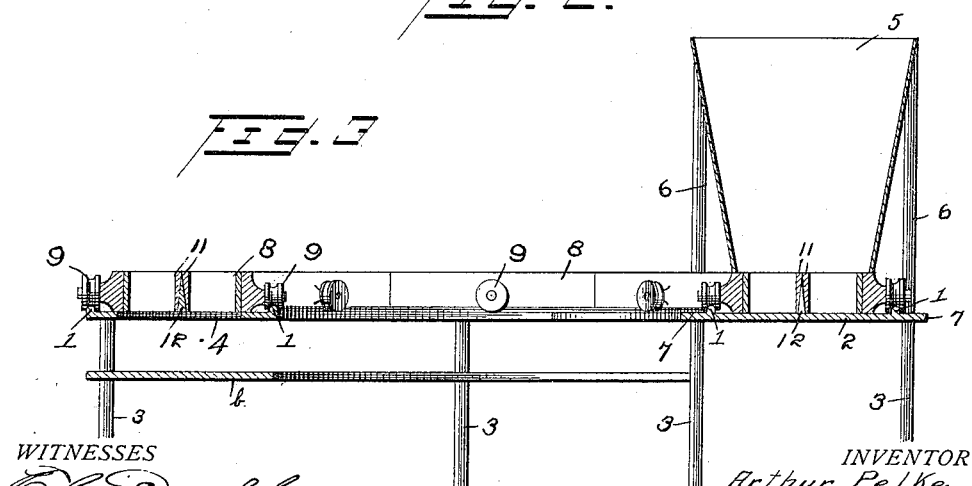

Figure 1 is a top plan view of an apparatus made in accordance with this invention. Fig. 2 is a top plan view of the circular track and table, with the traveling mold boxes and stationary hopper removed. Fig. 3 is a central vertical section of the apparatus as shown in Fig. 1.

Referring to the drawings, the numeral 1 designates the rails of the circular track formed on or secured to a circular table or support 2, mounted upon suitable legs or standards 3, and supported above the ground or floor. The table 2 is provided with opening 4 extending partially around the same. A hopper 5 for containing the plastic material is supported by suitable standards 6 which extend through sustaining flanges 7 projecting from the table 2. The mold boxes 8 are each provided with grooved rollers 9, mounted to travel on the circular track 1, said mold boxes having end extensions 10, which occupy the spaces between the boxes and are preferably flush with the upper edges of said boxes to prevent the plastic material fed by the hopper from dropping between the mold boxes. Removable partitions 11 extend from end to end within the boxes 8, said partitions being thinner at their lower edges, as shown in Fig. 3, and a removable wedge or core 12 separates the partitions 11 and when withdrawn permits the finished blocks to drop out of the mold box. Spacing members 13 divide up the spaces at opposite sides of the partitions 11, and, as shown in Fig. 1, ten blocks are formed in each mold box. Any suitable number of mold boxes may be utilized and the sizes of the blocks may be varied. As shown in the drawings, eight mold boxes are utilized, and each box is designed to contain ten blocks.

The operation of the invention may be briefly described as follows: A quantity of plastic concrete material is placed in the hopper 5 and the mold boxes 8 are moved either by hand or power in the direction of the arrow in Fig. 1 until they pass under the hopper where the material is fed by gravity into the compartments of the mold boxes. The lower edges of the hopper slick off the material and as the boxes pass out from underneath the hopper the blocks are pressed by means of a hydraulic or other press, (not shown), at the point *a*, and from thence the mold boxes are moved until they arrive at the opening 4 in the table, where after the wedges 12 have been removed the blocks drop out of the boxes onto the table or support *b* or upon pallets to be carried to a place for curing and drying.

From the foregoing it will be obvious that a continuous process may be carried on by our apparatus, that the blocks will be formed quickly, and that very few attendants are required to operate the apparatus.

We claim:

1. An apparatus for making concrete blocks comprising a circular track, a table upon which the track is supported, a stationary hopper supported on said table, a series of mold boxes provided with rollers mounted to run on said track underneath said hopper for filling the mold boxes, said table forming a bottom for the molds and said table being provided with a discharge opening located between the tracks.

2. An apparatus for molding building blocks comprising a circular track, a table on which said track is mounted, said table having a discharge opening therein between the rails, a stationary hopper mounted on the table, a series of mold boxes mounted on rollers for running on said track and adapted to discharge through the opening in the table, said boxes being open at the top and bottom and having sliding contact with the table top, partitions in said boxes and removable wedges between said partitions.

In testimony whereof we affix our signatures in presence of two witnesses.

ARTHUR PELKE.
FLOYD EDMOND HAYES.

Witnesses for Arthur Pelke:
J. B. GLASS,
TORGE WOLFF.

Witnesses for Floyd E. Hayes:
BURTON W. WILSON,
M. R. MORALES.

---

Copies of this patent may be obtained for five cents each, by addressing the "Commissioner of Patents, Washington, D. C."